Jan. 4, 1966     T. P. FUCCI     3,226,729
EYE SHIELD
Filed Feb. 18, 1963
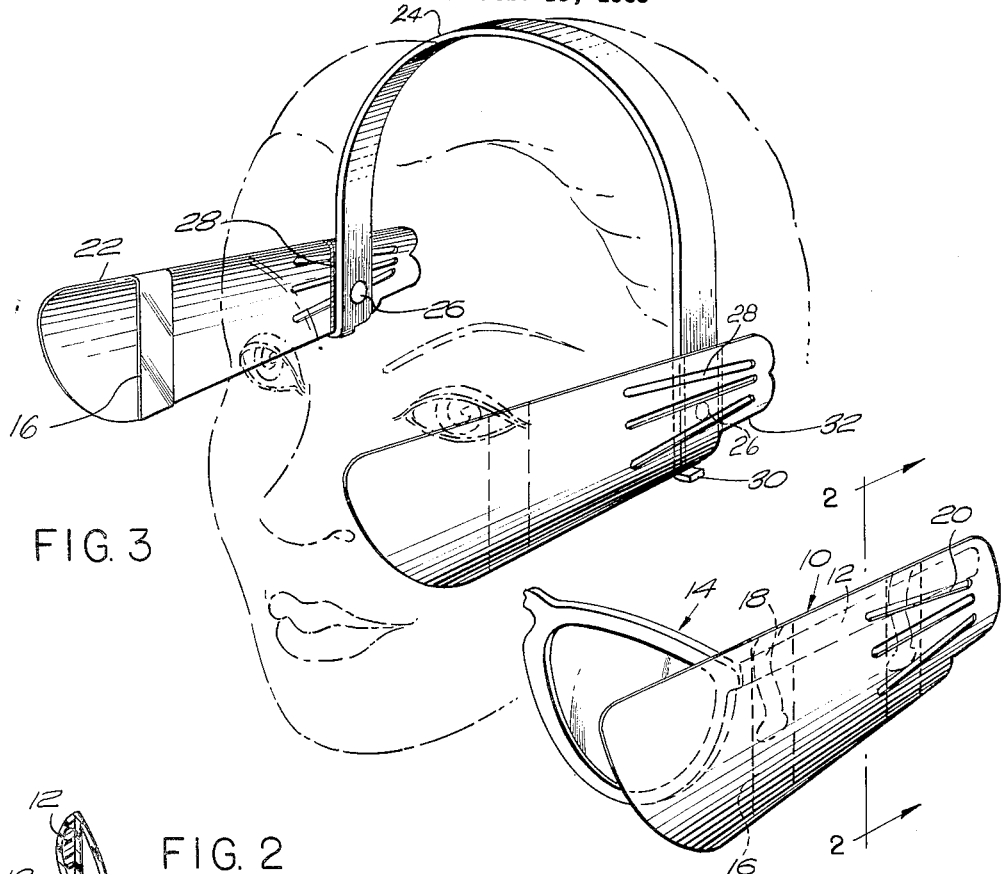
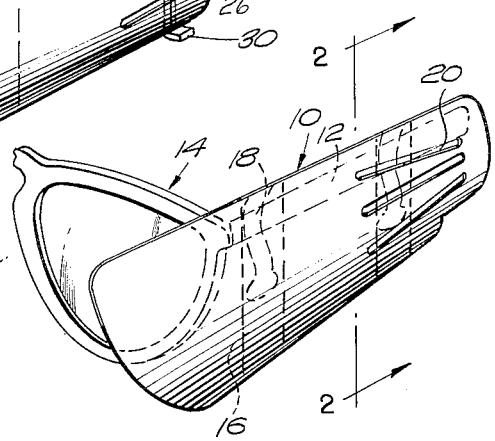
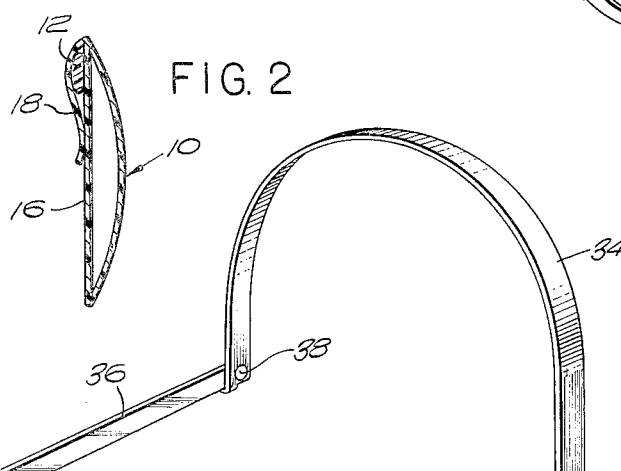
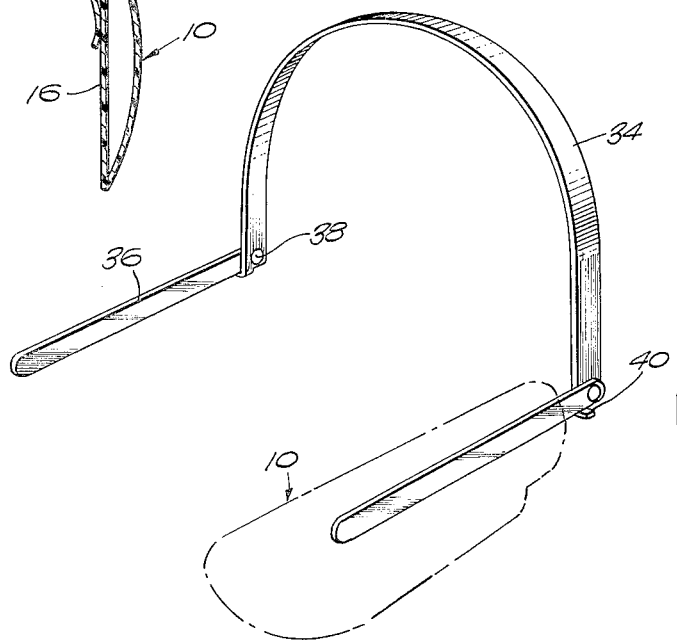
INVENTOR.
THERESA P. FUCCI
BY *Morse & Altman*
ATTORNEYS

United States Patent Office 3,226,729
Patented Jan. 4, 1966

3,226,729
EYE SHIELD
Theresa Pauline Fucci, 202 Lake St.,
East Weymouth, Mass.
Filed Feb. 18, 1963, Ser. No. 259,050
2 Claims. (Cl. 2—12)

This invention relates generally to eye shields, and more particularly, comprises a new and improved device which may be used alone or as an accessory for conventional eyeglasses and sunglasses for the purpose of shielding the eyes of the wearer from side lighting.

Under certain conditions, conventional sunglasses are ineffective for the purpose intended, which is to shield the eyes of the wearer from direct exposure to the sun's rays. For example, when driving in the period that follows sunrise and the period that precedes sunset, when the sun is low on the horizon, the drivers frequently find the sun's rays to be bothersome, particularly when driving in a north-south direction. Conventional sunglasses provided no protection whatsoever from side lighting, and even sunglasses with curved lenses fail to completely block out the sun directed against the side of the face. Such bright side lighting is both uncomfortable and dangerous, since it interferes strongly with the driver's vision. Also, for those who must wear prescription eyeglasses constantly, there is no means presently available for efficiently protecting their eyes from incident side lighting.

Accordingly, it is an object of the present invention to provide a new and improved shield for protecting the eyes from light directed towards either side of the wearer's face.

Another object of this invention is to provide a new and improved eye shield for quick and easy attachment to the temple bars of conventional sunglasses or eyeglasses.

Still another object of this invention is to provide a novel headband and attached eye shields for wearing the shields independently of conventional sunglasses or eyeglasses.

More particularly, this invention features a shield for protecting the eyes of the wearer from side lighting comprising an elongated panel preferably formed from a semi-rigid sheet material which is both transparent and tinted to filter out harmful components of the sun's rays. According to a preferred embodiment of the invention, each shield is provided with clips for attaching the shield over the temple bars of eyeglasses or sunglasses on the wearer. According to the invention, each shield is laterally curved to make the shield longitudinally rigid and to provide for circulation of air between the shield and the wearer.

In a modification of the invention, a headband is provided with a pair of shields which are pivotaly mounted at either side of the band for movement into and out of an eye-shielding position.

But these and other features of the invention, along with further objects and advantages thereof, will become more readily apparent from the following detailed description of the invention with reference being made to the acompanying drawings in which:

FIGURE 1 is a view in perspective showing an eye shield made according to the invention and attached to the temple bar of an eyeglass frame.

FIGURE 2 is a cross sectional view taken along the line 2—2 of FIGURE 1.

FIGURE 3 is a view in perspective of a modification of the invention, and

FIGURE 4 is a view similar to FIGURE 3 but showing still another modification of the invention.

Referring now to the drawings and more particularly to FIGURES 1 and 2, the reference character 10 generally indicates an eye shield detachably mounted to a temple bar 12 of a conventional eyeglass or sunglass frame 14. The eye shield 10 preferably is formed from a panel of relatively stiff yet somewhat resilient material such as cellulose acetate or the like which has been tinted or otherwise provided with a suitable light filtering medium so as to block out objectionable components of the sun's rays. A variety of materials may be employed in the fabrication of the shield. For example, a panel of light-polarizing material, such as that manufactured by the Polaroid Corporation or any other similar material which is easily formed and possesses the desired characteristics of stiffness, strength, and transparency and also possesses light-filtering or polarizing capabilities.

In FIGURE 1 the shield 10 has an elongated, tapered configuration with the wider portion thereof located towards the front of the wearer's face and generally opposite to the eyes. When mounted in position, the forward end of the shield extends perhaps an inch or so in front of the eyeglasses 14 to prevent the entry of light directed from the forward quarter of the eye. The forward edge of the shield will be seen to curve downwardly towards the cheekbone and then rearwardly towards the ear of the wearer. The shield has sufficient length and width to effectively shield the eyes from light directed against the side of the wearer's face.

As best shown in FIGURE 2, the shield 10 is laterally curved outward along its entire length with its upper and lower margins connected by means of a pair of spaced vertical cross braces 16 which may be formed integral with the shield. Each of the cross braces 16 may have a clip portion 18 punched out from its midportion with its upper end connected to the upper edge of the shield. The clips bow outwardly at their upper portions while their lower portions curve inwardly into tangency with the brace 16 with a slight reverse curvature at their lower ends to facilitate slipping the shield over the temple bar 12.

It will be appreciated that the shields, being outwardly convex from end to end, are longitudinally rigid and permit the passages of cooling air between the wearer's temples and the shields. To this end each shield is provided with longitudinal slots 20 formed near the rearward portion of the shield to further enhance venting between the shield and the wearer.

The shield illustrated in FIGURES 1 and 2 is designed particularly for use with conventional eyeglasses or sunglasses, as illustrated, and may be readily attached or detached from the temple bar. When not in use the shields may be slipped into a shirt pocket, for example, or clipped to a sunvisor. By reason of their unique design, the shields may be manufactured at a very low cost, are light in weight, comfortable to wear, and convenient to use. The shields are particularly useful for driving, since they will effectively reduce the intensity of the sun's rays falling directly upon the side of the face, as well as filter out objectionable glare.

In FIGURE 3 there is shown a modification of the invention, and in this embodiment a pair of eye shields 22 are supported by a headband 24 so that the shields may be worn independently of eyeglasses or sunglasses. The headband 24 has the configuration of an inverted "U" and preferably is fabricated from a resilient plastic strip adapted to press against the sides of the head with sufficient pressure to hold the shields in their proper positions.

As shown, each of the shields is pivoted to the headband 24 by means of a pin 26 which extends through either end of the headband and through a cross brace 28 formed towards the rearward end of the shield and similar to the cross brace 16 of the principal embodiment. This arrangement permits the shields to be folded up into a vertical position when not in use. In order to limit the movement of the shields, each end of the band 24 is formed with an outwardly extending tab 30 which provides a shoulder or stop for the shields when used in a normal manner, such as illustrated in FIGURE 3. The lower edge of the shield butts against the upper surface of the tab 30 to hold the shields in a forwardly extending position. When the shields are rotated upwardly, the rear edge of the tab 30 strikes a notched rear edge 32 of the shield to prevent the shield from rotating completely backwards.

As before, each of the shields is outwardly curved and vented so as to provide an air passage between the wearer and the shield.

In FIGURE 4 there is illustrated another modification of the invention and in this embodiment a headband 34, similar to the headband 24 of FIGURE 3, is provided with elongated arms 36 pivoted to either end of the band by means of pins 38. A tab 40 is formed on either end of the headband and serves as a stop for the arms when in the lowered position illustrated. The FIGURE 4 device is for use in wearing the eye shields 10 of FIGURES 1 and 2 when eyeglasses or sunglasses are not worn. It will be understood that the eye shield 10 will be clipped over either arm 36 in the same fashion as the shields are clipped onto the temple bars of conventional glasses.

The invention described and illustrated herein has utility not only in driving during daylight hours but also may be used to advantage in any outdoor activity under conditions of bright sunlight or high glare. For example, the eye shields will be found to provide comfort and convenience to the wearer in such activities as driving, boating, fishing, and the like without impairing the wearer's peripheral vision. In addition, the shields may be readily manufactured from materials currently available and may be marketed at a very low cost.

While the invention has been described with particular reference to illustrated embodiments, it will be understood that numerous modifications thereto will appear to those skilled in the art. It will also be understood that the above description and accompanying drawings should be taken as illustrative of the invention and not in a limiting sense.

Having thus described the invention, what I claim and desire to obtain by Letters Patent of United States is:

1. In combination, a resilient headband having an inverted U-shaped configuration for clamping engagement over the head, an elongated arm means mounting said arm for pivotal movement to each leg of said headband, stop means on said headband engageable with said arms for limiting the movement thereof, and a pair of eye shields detachably secured to said arms, each of said shields comprising an elongated panel of relatively stiff transparent material having light filtering characteristics, each of said panels being formed with an outward lateral curvature extending from end-to-end of said panel and defining a longitudinal passage between said shield and the wearer's face, said panel extending the length of said arms and means detachably mounting each of said shields to said arms.

2. Eye shields for attachment to the temple bars of eye glass frames and the like, each of said shields comprising an elongated rearwardly tapered panel of relatively stiff transparent material having light filtering characteristics, each of said panels being formed with an outward lateral curvature extending from end to end of said panel and adapted to define a longitudinal passage between said shield and the wearer's face, said panel extending substantially the length of said temple bar when attached thereto and having a leading portion extending forwardly of said frame when attached to said temple bars, a plurality of cross braces integral with said panels and connecting opposite longitudinal edges of each of said panels and an elongated resilient clip formed integrally on at least two of the braces of each of said panels, each of said clips having one end attached adjacent the upper end of said associated brace and in parallel relation therewith, and having the other end thereof open for reception of said temple bar, each of said panels being formed with a plurality of openings in the rearward portion thereof and out of the wearer's field of view for venting said shield.

References Cited by the Examiner
UNITED STATES PATENTS

| | | | |
|---|---|---|---|
| 422,001 | 2/1890 | Wilson | 2—13 |
| 1,706,682 | 3/1929 | Takacs | 2—13 |
| 2,224,784 | 12/1940 | Goldschmid et al. | 2—13 |
| 2,460,373 | 2/1949 | Waldman | 2—14.8 |
| 2,858,539 | 11/1958 | Carlson | 2—13 |
| 2,900,639 | 8/1959 | Lindstrom | 2—13 |

FOREIGN PATENTS

| | | |
|---|---|---|
| 652,728 | 11/1937 | Germany. |
| 113,357 | 2/1918 | Great Britain. |

JORDAN FRANKLIN, *Primary Examiner.*